United States Patent [19]
Kotani

[11] Patent Number: 5,119,253
[45] Date of Patent: Jun. 2, 1992

[54] ROTARY ACTUATOR FOR DISK DRIVE
[75] Inventor: Yuji Kotani, Kanagawa, Japan
[73] Assignee: Sony Corporation, Japan
[21] Appl. No.: 615,386
[22] Filed: Nov. 19, 1990
[30] Foreign Application Priority Data
Nov. 29, 1989 [JP] Japan .................................. 1-307733
[51] Int. Cl.⁵ .............................................. G11B 21/08
[52] U.S. Cl. ...................................... 360/106; 310/36
[58] Field of Search ................. 360/106; 310/13, 36, 310/67 R
[56] References Cited
U.S. PATENT DOCUMENTS
4,835,643 5/1989 Schulze .............................. 360/106

Primary Examiner—Robert S. Tupper
Attorney, Agent, or Firm—Ronald P. Kananen

[57] ABSTRACT

Described herein is a moving coil type rotary actuator for a disk drive, which essentially includes: a rotary arm supporting transducer means at one end thereof, and rotatably supported for rotation about an axis; a first york arranged in a first plane perpendicular to the rotational axis; a second york arranged in a second plane in a spaced relation parallel with the first york and perpendicular to the rotational axis; a first permanent magnet mounted on the surface of the first york to produce a first magnetic field between the second york and itself; a second permanent magnet mounted on one surface of the second york in staggered relation with the first magnet on the first york to produce a second magnetic field between the first york and itself; and a moving coil supported by the rotary arm at the other end thereof and having first and second coil portions positioned within the first and second magnetic fields, respectively.

5 Claims, 5 Drawing Sheets

ROTARY ACTUATOR FOR DISK DRIVE

BACKGROUND OF THE INVENTION

1. Field of the Invention

This invention relates to a magnetic disk drive such as a hard disk drive or the like, and more particularly to a moving coil type rotary actuator suitable for used on a magnetic disk drive for driving a magnetic head arm in accessing to a specified track on a disk.

2. Description of the Prior Art

In a magnetic disk drive, in order to gain access to a specified track on a disk, a magnetic head arm is driven by a moving coil type rotary actuator which is arranged, for example, as shown in FIG. 1. For tracking a specific track by a magnetic head 51 on one end of a magnetic head arm 52, a moving coil 53 is provided at the other end of the arm which is rotatably supported on a rotational shaft 54.

Located on the opposite sides of the moving coil 53 are first and second yorks 55 and 56 which have first and second pairs of permanent magnets 57 and 58 and 59 and 60 (each pair being formed by the adjacently positioned magnets) securely fixed thereon. The moving coil 53 is rotatably supported between the inner opposing surfaces of the first and second yorks 55 and 56 with the first and second pairs of permanent magnets 57 and 58 and 59 and 60, respectively.

As shown in FIG. 2, the moving coil 53 is constituted by first and second effective coil portions 61 and 62, first and second ineffective coil portions 63 and 64, and R (round) portions 65 to 68 connecting the first and second effective coil portions 61 and 62 with the first and second ineffective coil portions 63 and 64.

The first and second pairs of permanent magnets 57 and 58 and 59 and 60 are each arranged to have an inverse polarity on the side of the first and second effective coil portions 61 and 62 (or on the side of the magnetic gap) relative to the other one of the same pair (the magnets fixed on the same yoke) and relative to the opposing one of the other pair (the magnets fixed on the other yoke) as shown in FIG. 3. Namely, for example, facing the effective coil portions 61 and 62, the permanent magnet 57 has the N pole, the permanent magnet 58 the S pole, the permanent magnet 59 the S pole, and the permanent magnet 60 the N pole.

In operation of the prior art moving coil actuator of the above-described arrangement, if current I is passed through the effective coil portions 61 and 62 of the moving coil 53 in the direction shown in FIG. 3, a propulsive force urges the moving coil 53 in the direction of arrow A according to Flemming's left-hand rule, turning the arm 52 and the magnetic head 51 for access to a specified track. Conduction of current I in the opposite direction generates a propulsive force in the opposite direction.

Recently, the moving coil type actuators for magnetic disk drives have been required to have a greater propulsive force in order to meet the strong demands for reductions in size and thickness. In this connection, magnets of rare earth cobalt, like samarium, with a large energy product, are resorted to as permanent magnets in most cases. However, since rare earth cobalt magnets are very expensive, attempts have been made to enhance the efficiency in usage of such permanent magnets, reducing the weights of the permanent magnets by eliminating them from those portions which do not effectively contribute to generation of the propulsive force. The first and second effective coil portions 61 and 62 contribute to the propulsive force while the first and second ineffective coil portions 63 and 64 do not. The R portions 65 to 68 contribute to the propulsive force only at a rate smaller than 50% in terms of their length, and obviously not at a rate of 100%. Therefore, it is often the case to employ an arrangement in which the first and second pairs of permanent magnets 57 and 58 and 59 and 60 have widths which are equal to the length of the effective coil portions 61 and 62 in width in a direction perpendicular to the direction of the propulsive force on the moving coil 53.

FIG. 4 illustrates another prior art moving coil type rotary actuator which has only the second pair of permanent magnets 59 and 60 fixed ont he second yoke 56.

In case of the conventional moving coil type rotary actuators as shown in FIGS. 1 through 4, which have the first pair of permanent magnets 57 and 58 and/or the second pair of permanent magnets 59 and 60 fixed side by side on the first yoke 55 and/or the second yoke 56 in such a manner as to have inverse polarity relative to the other one, there arises a problem of diminution of main flux $\phi_M$ due to leakage flux $\phi_R$ of minor loop as shown in FIG. 3.

Consequently, the propulsive force of the actuator becomes weaker, resulting in a slower access to a desired track. Therefore, it becomes necessary to provide larger permanent magnets to compensate for the diminution of the main flux $\phi_M$, which makes it difficult to reduce the size of the actuator as a whole and, due to expensiveness of the magnets, invites a substantial increase in cost.

OBJECTS AND SUMMARY OF THE INVENTION

The present invention contemplates a solution to the above-mentioned problems of the prior art, and has as its object the provision of a moving coil type rotary actuator with improved propulsive force, which is arranged to reduce the leakage flux between the first and second permanent magnets to prevent diminution of the main flux.

In accordance with the present invention, there is provided a rotary actuator for a disk drive, which essentially comprises: a rotary arm supporting transducer means at one end thereof, and rotatably supported for rotation about an axis; a first yoke arranged in a first plane perpendicular to the rotational axis; a second yoke arranged in a second plane in a spaced relation parallel with the first yoke and perpendicularly to the rotational axis; a first permanent magnet mounted on one surface of the first yoke to produce a first magnetic field between the second yoke and itself; a second permanent magnet mounted on one surface of the second yoke in staggered relation with the first magnet on the first yoke to produce a second magnetic field between the first yoke and itself; and a moving coil supported by the rotary arm at the other end thereof and having first and second coil portions positioned within the first and second magnetic fields, respectively.

According to an aspect of the invention, the moving coil is formed in a stepped form holding the first coil portion closer to the second yoke than to the first yoke while holding the second coil portion closer to the first yoke than to the second yoke.

The above and other objects, features and advantages of the invention will become apparent from the follow-

DESCRIPTION OF PREFERRED EMBODIMENTS

Figure 1:
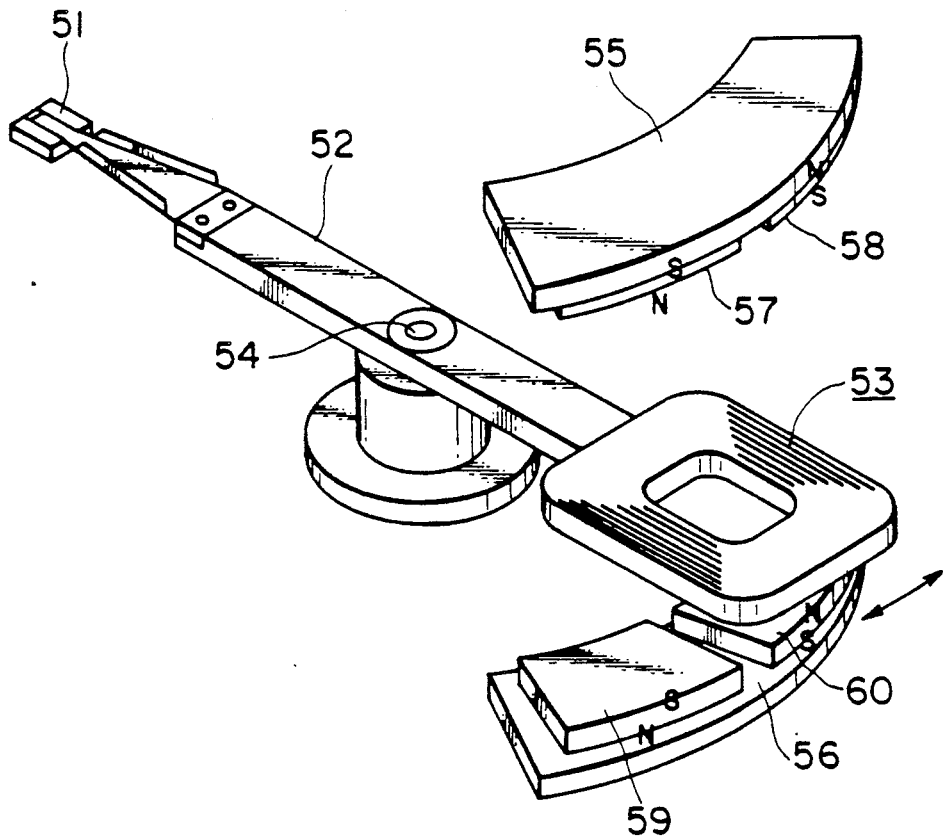
FIG. 1 is a disassembled perspective view of a conventional moving coil type actuator.
Figure 2:
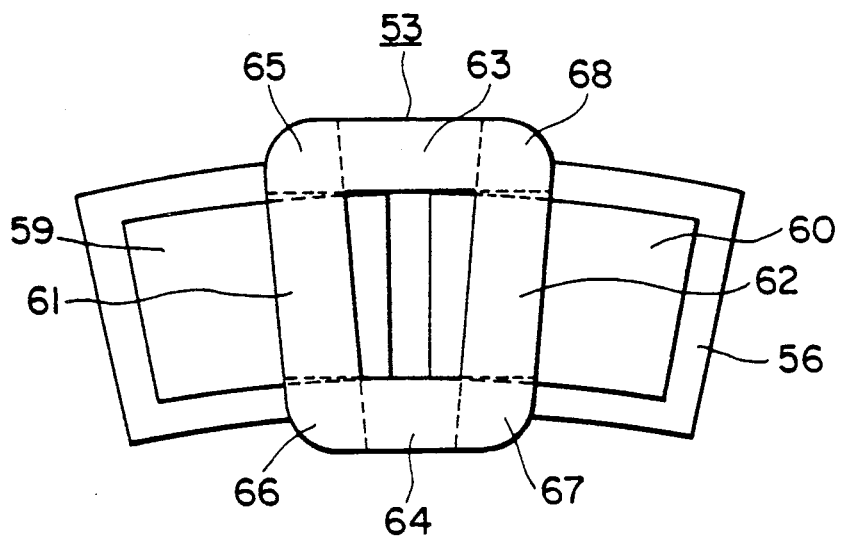
FIG. 2 is a plan view of the moving coil of the conventional actuator.
Figure 3:
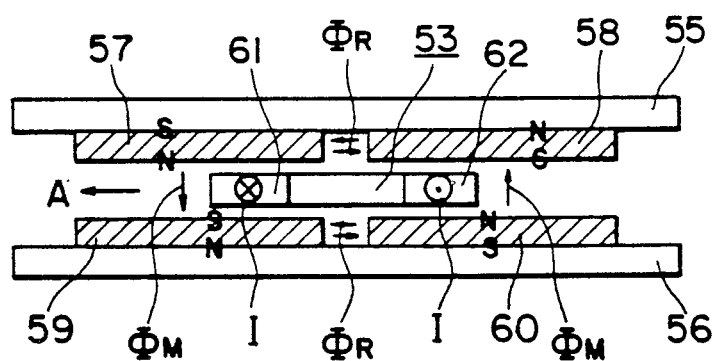
FIG. 3 is a sectional view of major components of the conventional actuator.
Figure 4:
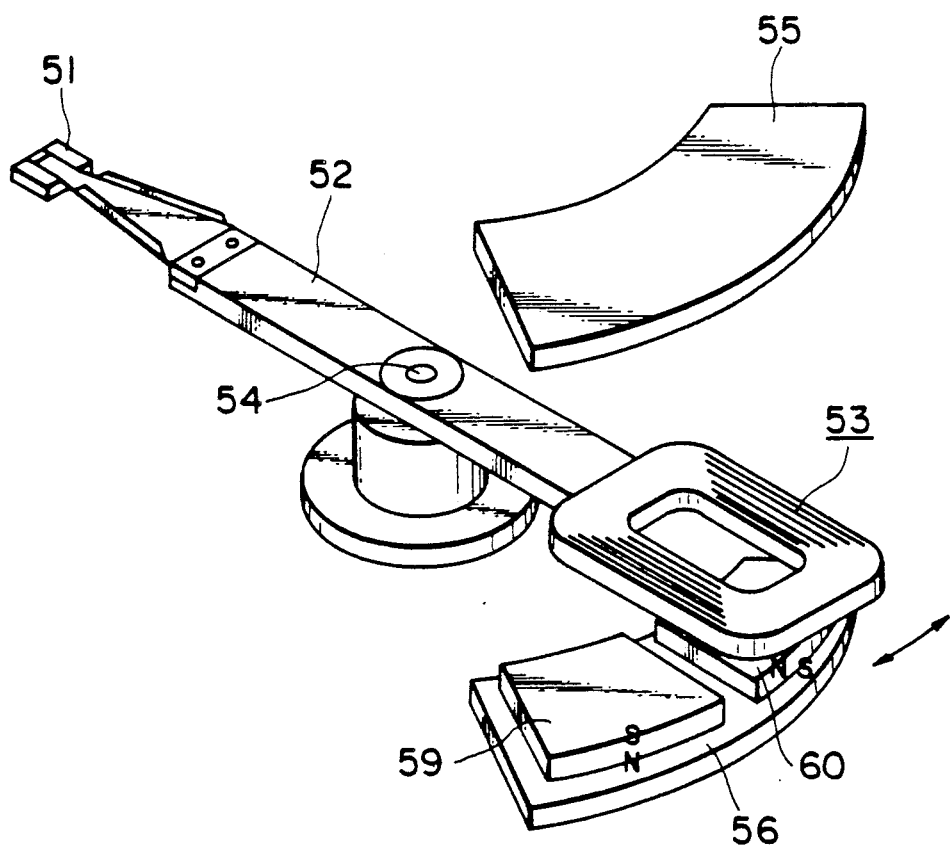
FIG. 4 is a disassembled perspective view of another conventional moving coil type actuator.
Figure 5:
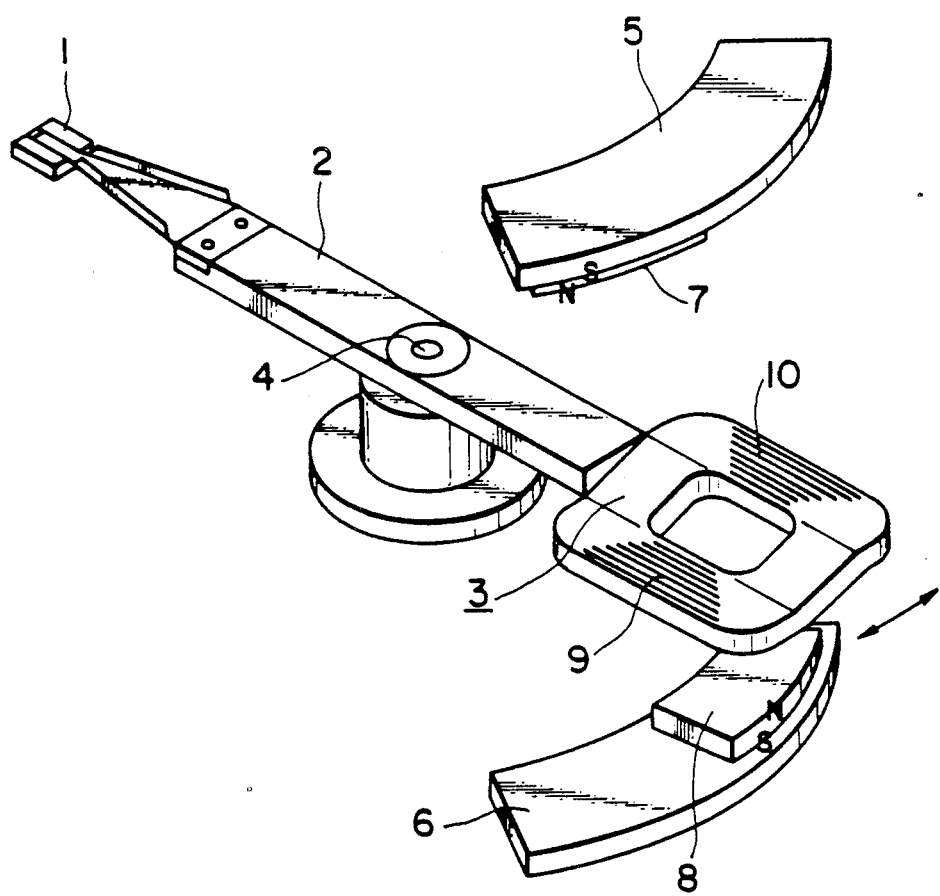
FIG. 5 is a disassembled perspective view of a moving coil type actuator according to the invention.

Referring to FIG. 5, there is shown a moving coil type actuator embodying the present invention, in which, for accessing a specified track on a magnetic disk, a magnetic head 1 is mounted on one end of a magnetic head arm 2 which supports a moving coil 3 at the other end thereof and which is rotatably supported by a rotational shaft 4.

The actuator further includes first and second permanent magnets 7 and 8 which are securely fixed on opposing surfaces of parallel first and second yokes 5 and 6, respectively, in staggered positions or in non-overlapping relation with each other. The yokes 5 and 6 are each in the form of a thin flat strip which can be fabricated at low cost. On the other hand, the first and second permanent magnets 7 and 8 are magnets of rare earth cobalt like samarium, which has a large energy product. The moving coil 3 is rotatably supported between and in a face-to-face relationship with the first and second yokes 5 and 6 and with the first and second permanent magnets 7 and 8.

Figure 6:
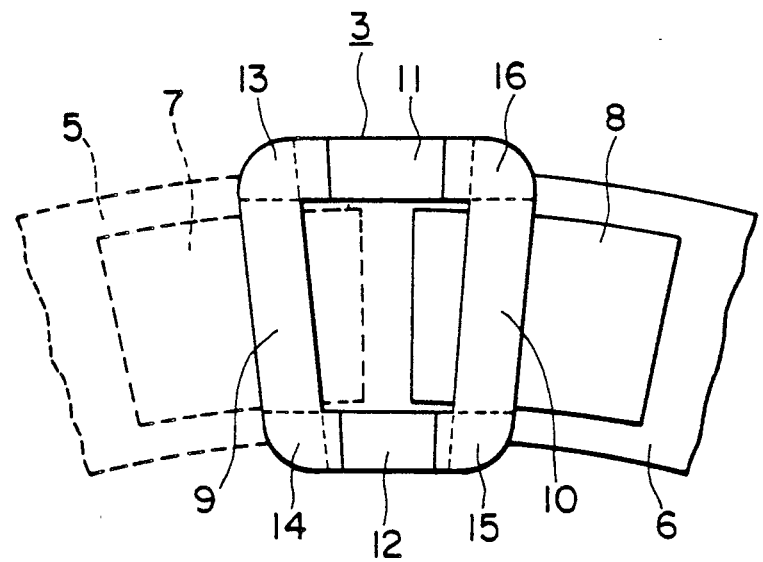
FIG. 6 is a plan view of the moving coil of the actuator according to the invention.
Figure 7:
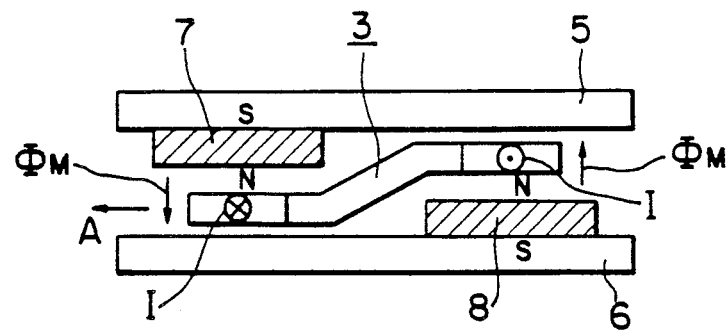
FIG. 7 is a sectional view of major components of the actuator according to the invention.

The moving coil 3 is formed by winding conductive wire and, as shown particularly in FIGS. 5 and 7, has a stepped shape. Further, as shown in FIG. 6, the moving coil 3 is comprised of first and second effective coil portions 9 and 10, first and second ineffective coil portions 11 and 12, and R (round) portions 13 to 16 connecting the first and second effective coil portions 9 and 10 with the first and second ineffective coil portions 11 and 12.

In a direction perpendicular to the propulsive force on the moving coil 3, the first and second permanent magnets 7 and 8 are dimensioned to have a width slightly smaller than the length of the first and second effective coil portions 9 and 10. Arrangements are made to keep the first and second permanent magnets 7 and 8 from contacting the first and second ineffective coil portions 11 and 12.

Specifically, as shown particularly in FIG. 7, the moving coil type actuator of the invention is arranged such that the first effective coil portion 9 of the moving coil 3 faces on one side thereof the first permanent magnet 7 through a magnetic gap and on the other side faces the second yoke 6 directly through a magnetic gap. The second effective coil portion 10 is arranged to face on one side thereof the first yoke 5 directly through a magnetic gap and on the other side to face the second permanent magnets 8 through a magnetic gap.

The first and second permanent magnets 7 and 8 are arranged to have the same polarity, for example, the north pole on the inner side which faces the first or second effective coil portion 9 or 10 (or on the side which faces the magnetic gap).

In operation, upon passing current I through the first and second effective coil portions 9 and 10 of the moving coil 3 in the direction shown in the drawing, a propulsive force urges to the moving coil 3 in the direction of arrow A according to Flemming's left-hand rule, turning the arm 2 and the magnetic head 1 on the arm for access to a specified track on a disk. A propulsive force of the opposite direction is generated by reversing the current direction.

It will be appreciated from the foregoing description that, with the arrangements according to the invention, the thickness of the actuator as a whole is determined by the first and second yokes, one of the first and second permanent magnets and the magnetic gaps, so that it can be made thinner as compared with its conventional counterpart, in a degree corresponding to the thickness of one permanent magnet. While retaining the functions of the conventional counterparts, a significant reduction in cost is made possible by the arrangement of the invention, eliminating expensive rare earth cobalt magnets from those portions which do not effectively contribute to the propulsive force and by using flat, strip-like yokes. In addition, the first and second permanent magnets are fixed in staggered positions on the yokes and arranged to have the same pole on the side of the magnetic gap, so that it becomes possible to reduce the leakage flux between the two permanent magnets, preventing diminution of the main flux to guarantee an improved propulsive force.

What is claimed is:

1. A rotary actuator for a disk drive, comprising:
   a rotary arm supporting transducer means at one end thereof, and rotatably supported for rotation about an axis;
   a first yoke arranged in a first plane perpendicular to said rotational axis;
   a second yoke arranged in a second plane in parallelly spaced relation parallel with said first yoke and perpendicular to said rotational axis;
   a first permanent magnet mounted on one surface of said first yoke to produce a first magnetic field between said second yoke and itself;
   a second permanent magnet mounted on one surface of said second yoke in staggered relation with said first magnet to produce a second magnetic field between said first yoke and itself; and
   a moving coil supported by said rotary arm at the other end thereof and having first and second effective coil portions positioned within said first and second magnetic fields, respectively.

2. A rotary actuator for a disk drive according to claim 1, wherein said moving coil is formed in a stepped shape holding said first coil portion closer to said second yoke than to said first yoke while holding said second portion closer to said first yoke than to said second yoke.

3. A rotary actuator for a disk drive according to claim 1, wherein said first and second magnets are made of rare earth cobalt including samarium.

4. A rotary actuator for a disk drive according to claim 1, wherein said first and second permanent magnets are arranged to have the same polarity on the side of said magnetic gap.

5. A rotary actuator for a disk drive according to claims 1 to anyone of 4, wherein said first and second yokes are each in the form of a thin flat strip.

* * * * *